US006008752A

United States Patent [19]

Husk et al.

[11] Patent Number: 6,008,752

[45] Date of Patent: Dec. 28, 1999

[54] DOPPLER-BASED TRAFFIC RADAR SYSTEM

[75] Inventors: Byron E. Husk, Owensboro; Daniel P. Bowlds, Hawesville; Harvey F. Bowlds, Owensboro, all of Ky.

[73] Assignee: MPH Industries, Inc., Owensboro, Ky.

[21] Appl. No.: 09/154,314

[22] Filed: Sep. 16, 1998

[51] Int. Cl.[6] ...... G01S 13/08

[52] U.S. Cl. ...... 342/104; 342/114; 342/115; 342/116

[58] Field of Search ...... 342/104, 114, 342/115, 111, 116

[56] References Cited

U.S. PATENT DOCUMENTS

| | | | |
|---|---|---|---|
| 3,750,172 | 7/1973 | Tresselt | 342/129 |
| 3,898,655 | 8/1975 | Tresselt | 342/83 |
| 4,070,634 | 1/1978 | Barker et al. | 331/2 |
| 4,148,028 | 4/1979 | Fujiki | 342/70 |
| 4,184,156 | 1/1980 | Petrovsky et al. | 342/104 |
| 4,293,859 | 10/1981 | Sergent | 343/702 |
| 4,335,383 | 6/1982 | Berry | 342/115 |
| 4,740,045 | 4/1988 | Goodson et al. | 342/112 |
| 4,743,908 | 5/1988 | Brassfield et al. | 342/113 |
| 4,818,999 | 4/1989 | Kobayashi et al. | 342/59 |
| 5,150,128 | 9/1992 | Kongelbeck | 342/174 |
| 5,181,038 | 1/1993 | Asbury et al. | 342/70 |
| 5,285,207 | 2/1994 | Asbury et al. | 342/129 |
| 5,400,034 | 3/1995 | Smith | 342/103 |
| 5,402,129 | 3/1995 | Gellner et al. | 342/70 |
| 5,504,488 | 4/1996 | Henderson et al. | 342/115 |
| 5,510,795 | 4/1996 | Koelle | 342/114 |
| 5,525,996 | 6/1996 | Aker et al. | 342/104 |
| 5,528,245 | 6/1996 | Aker et al. | 342/104 |
| 5,528,246 | 6/1996 | Henderson et al. | 342/115 |
| 5,557,281 | 9/1996 | O'Conner | 342/114 |
| 5,563,603 | 10/1996 | Aker et al. | 342/115 |
| 5,565,871 | 10/1996 | Aker et al. | 342/176 |
| 5,570,093 | 10/1996 | Aker et al. | 342/104 |
| 5,598,171 | 1/1997 | Cole | 343/721 |
| 5,691,724 | 11/1997 | Aker et al. | 342/104 |
| 5,917,430 | 6/1999 | Greneker, III et al. | 340/905 |

OTHER PUBLICATIONS

Applied Concepts, Inc., "Brochure," Stalker DSR, Date Unknown.

*Primary Examiner*—John B. Sotomayor
*Attorney, Agent, or Firm*—King and Schickli

[57] ABSTRACT

A Doppler-based radar system used to determine the speed of a selected moving target includes an array of selectable filters and related method for determining the speed of the selected moving target traveling in the same lane as a moving patrol vehicle supporting the radar system independent of the direction of the target relative to the platform. This allows the speed of the target vehicles traveling in the same lane and in the same direction as the patrol vehicle to be monitored without manual assistance from the operator. The radar system is further adapted in a stationary mode of operation to determine the speed of a selected moving target independent of the location of the patrol vehicle. This is accomplished by selectively filtering either all approaching or receding targets depending upon the traffic scenario.

16 Claims, 3 Drawing Sheets

TURNSTILE
14
S4
S5
46
46
CONVERTER
48
S6
S7
SHIFTER
54
SUMMER
52
S6
S7
FILTER
58
FILTER
58
S10
S9
S8
PROCESSOR
50
MEMORY
56
PHASE DETECTOR
60
RESISTOR
64
$PD_{OUT}$
$PD_{REF}$
COMPARATOR
62
DISPLAY
66

DOPPLER-BASED TRAFFIC RADAR SYSTEM

TECHNICAL FIELD

The present invention relates generally to a Doppler-based traffic radar system and, more particularly to a method for determining the speed of a target vehicle traveling in the same direction as a patrol vehicle independent of the direction of the target vehicle relative to the patrol vehicle.

BACKGROUND OF THE INVENTION

Law enforcement officers have utilized Doppler-based traffic radar systems to monitor vehicle speeds and enforce traffic speed limit laws for many years. Throughout this period of time, numerous improvements in both the underlying technology and in the specific application of new processing techniques for the traffic radar systems themselves, have afforded law enforcement officers greater flexibility and improved reliability in carrying out their duties. One such improvement evident in most traffic radar systems presently being marketed includes the capability to more accurately and reliably monitor the speed of certain vehicles while the patrol vehicle is either in a stationary or a moving mode of operation. In fact, the recent traffic radar systems can now successfully monitor the speed of vehicles approaching the moving patrol vehicle in an opposite lane.

In addition to these capabilities, such radar systems also provide the law enforcement officer the capability to monitor a group of target vehicles simultaneously and to determine the fastest vehicle within the group and/or the vehicle presenting the traditional strongest reflected return signal. Each of these new or improved existing capabilities provide the law enforcement officer with a more complete picture of the traffic environment and thus, a more flexible and reliable basis for making more informed decisions.

Despite all the improvements in both the underlying technology utilized in these traffic radar systems and the radar systems themselves, a broadly recognized shortcoming of these systems involves the successful monitoring of the speed of vehicles approaching/receding away from the patrol vehicle in the same-lane moving or stationary mode without operator intervention. In practice, even the most recent traffic radar systems require the law enforcement officer to make discretionary decisions regarding the relative movement of a target vehicle operating in the same lane as the patrol vehicle.

In other words, the law enforcement officer must visually observe the target vehicle in front of or behind the patrol vehicle and decide whether the vehicle is approaching or receding relative to the patrol vehicle. Of course, these manual operations are conducted while also maintaining operation of the patrol vehicle. Additionally, the officer must continually input this information into the radar system. Typically, a two-position manual switch located on a display or a handheld remote control device of the radar system is utilized to dictate the approaching/receding status of the target vehicle and to indicate the requisite method of calculation to be utilized by the radar system in determining the actual speed of the target vehicle. These discretionary decisions and required manual operations contribute to the curtailment of the overall flexibility and reliability afforded law enforcement officers by both conventional and digital signal processing (DSP) capable radar systems.

Thus, while conventional and DSP traffic radar systems are both capable of a high degree of accuracy with regard to vehicle speed measurements, great care must be exercised in the use of such systems in properly and accurately attributing a speed to a particular target vehicle. This is of increased importance when the law enforcement officer must initially visually observe the direction of the target vehicle relative to the patrol vehicle traveling in the same lane.

Yet another broadly recognized shortcoming of these traffic radar systems includes the inability to accurately monitor the speeds of vehicles approaching/receding away from the patrol vehicle in the stationary mode of operation in various situations. Typically to overcome this shortcoming, the patrol vehicle must position itself between the driving lanes; for example, within the median area along interstates or other divided highways. This effectively eliminates the unwanted approaching or receding targets from the beam of the radar signal, thus improving the accuracy and reliability afforded the law enforcement officer. The requirement that the patrol vehicle be located in a particular manner, however, severely limits the overall effectiveness of the radar system.

One alternative to establishing a monitoring position within the median of divided roadways presently available to law enforcement officers is to position the patrol vehicle on the shoulder parallel to the highway. This alternative is satisfactory in some settings, particularly along isolated, low volume highways but is of only limited value along the busier and more frequently patrolled highways, such as main traffic arteries. When monitoring vehicle speeds along these highways, the law enforcement officer is forced to wait for openings or gaps in the traffic pattern before utilizing the radar system to determine the speed of approaching/receding opposing lane vehicles. This is due to the potential interference in the radar system processing created by intervening vehicles traveling in the same lane in which the patrol vehicle is positioned.

Accordingly, a need is clearly identified for a radar system and related methods capable of determining the actual speed of a selected target vehicle traveling in the same lane as the moving patrol vehicle, or in a different lane than the stationary patrol vehicle. Such a radar system and related methods would effectively remove the reliance on discretionary decisions made by law enforcement officers in determining the relative direction of target vehicles operating in the same lane as the patrol vehicle, and would further increase the overall flexibility and reliability afforded the system operator, particularly in monitoring traffic across busy divided highways.

SUMMARY OF THE INVENTION

Accordingly, it is a primary object of the present invention to provide a novel and improved Doppler-based radar system capable of overcoming the limitations of the prior art.

Another object of the present invention is to provide a Doppler-based traffic radar system that increases the overall flexibility and reliability afforded a system operator.

Yet another object of the present invention is to provide a Doppler-based traffic radar system that eliminates the reliance on discretionary decision making by the system operator.

Still another object of the present invention is to provide a Doppler-based traffic radar system that determines the speed of a selected moving target traveling in the same direction as a moving platform supporting the radar system independent of the direction of the target relative to the platform.

It is another object of the present invention is to provide a Doppler-based traffic radar system that determines the speed of a selected moving target traveling in the same direction as a moving platform supporting the radar system independent of the direction of the target relative to the platform that includes an array of selectable filters to increase the accuracy of the speed measurements.

Yet another object of the present invention is to provide a method for determining the speed of a selected moving target traveling in generally the same direction as a moving platform supporting a Doppler-based radar system independent of the direction of the target relative to the platform that eliminates the reliance on discretionary decision making by the system operator.

Still another object of the present invention is to provide a method for determining the speed of a selected moving target traveling in generally the same direction as a moving platform supporting a Doppler-based radar system independent of the direction of the target relative to the platform utilizing a selective filtering step to increase the accuracy of the measurements.

Another object of the present invention is to provide a radar system and related method capable of monitoring the speed of vehicles approaching or receding away from the patrol vehicle in a stationary mode of operation independent of the location of the patrol vehicle.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel and improved Doppler-based traffic radar system is provided that increases the overall flexibility and reliability afforded the system operator, and most importantly eliminates the reliance on discretionary decision making. More specifically, the radar system of the present invention is adapted to determine the speed of a selected moving target traveling in generally the same direction as a moving platform supporting the radar system independent of the direction of the target relative to the platform. This allows the speed of target vehicles traveling in the same lane and in the same direction as the patrol vehicle to be monitored without manual intervention by the operator. The radar system is further adapted in a stationary mode of operation to determine the speed of a selected moving target independent of the location of the patrol vehicle. This is accomplished in part by selectively eliminating all unwanted approaching or receding targets depending upon the present traffic/patrol scenario.

The radar system of the present invention splits the return signals reflected from the at least one moving target in order to form a test processing signal and a reference processing signal. More specifically, the return signals received from an antenna are split in a turnstile, thus generating first and second split signals. The split signals are substantially equivalent. Within the turnstile the first split signal is mixed with a first portion of the transmitted signal to form a test processing signal. Likewise, the second split signal is mixed with a second portion of the transmitted signal to form a reference processing signal. In accordance with an important aspect of the present invention, any suitable means may be used to insure that the first and second portions of the transmitted signal and thus, the resultant processing signals are different in phase. For example, use of microstrip transmission lines of differing lengths connecting each of a pair of sniffer probes for coupling portions of the transmitted signal and mixers is sufficient to cause the signals to be different in phase.

Because the resulting processing signals are equal in magnitude, but different in phase, the direction of a selected target relative to the platform can be determined and the resulting speed accurately calculated. For instance, if the phase of the reference signal for an approaching target leads the phase of the test signal, then the phase of the reference signal for a receding target will lag the phase of the test signal. This phase differential in the processing signals also allows the radar system to more accurately calculate the speed of a selected target in the stationary mode of operation.

In accordance with another important aspect of the present invention, the speed determining circuitry includes a first means for transforming the processing signals from the time domain to the frequency domain to provide a frequency spectrum, a second means for selectively filtering the processing signals to allow only a range of frequencies substantially centered about the frequency of the selected moving target to pass, and a third means for selectively shifting the phase of one of the processing signals.

As is well known in the art, the resulting frequency spectrum of a time to frequency domain transformation necessarily includes a plurality of bins indicative of the Doppler components of the at least one target. More specifically, the Doppler components include the amplitude and frequency of each target. During operation, the radar system searches the Doppler components and selects a target according to the present operating mode of the radar system. For example, in a strongest target mode of operation, the Doppler components are searched for a target having the highest amplitude. Similarly, in a fastest target mode of operation, the Doppler components are searched for a target having the highest frequency.

Once the step of selecting a target in the moving mode of operation is accomplished, and irrespective of the fastest/strongest mode of operation of the radar system, a second means of the speed determining circuitry selectively filters the processing signals to allow only a range of frequencies substantially centered about the frequency of the selected moving target to pass. In accordance with the method of the present invention, each of the processing signals are passed through a selected band pass filter to filter unwanted noise and any additional unselected targets including the patrol vehicle signal. The resulting filtered processing signals are further utilized to determine the direction of the selected moving target relative to the platform. Based on the determined direction of the selected moving target, the speed of the target is calculated and displayed by the radar system for the operator's use.

In accordance with another important aspect of the present invention, a third means of the speed determining circuitry is provided for selectively shifting the phase of one of the processing signals dependent upon a mode of operation of the radar system. Specifically, shifting the phase of one of the processing signals eliminates either all approaching or receding vehicles from further speed calculations when the radar system is in the stationary mode of operation. This allows the law enforcement officer to position the patrol vehicle at any convenient location, for example, along the shoulder of a roadway even if the roadway is a divided highway.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
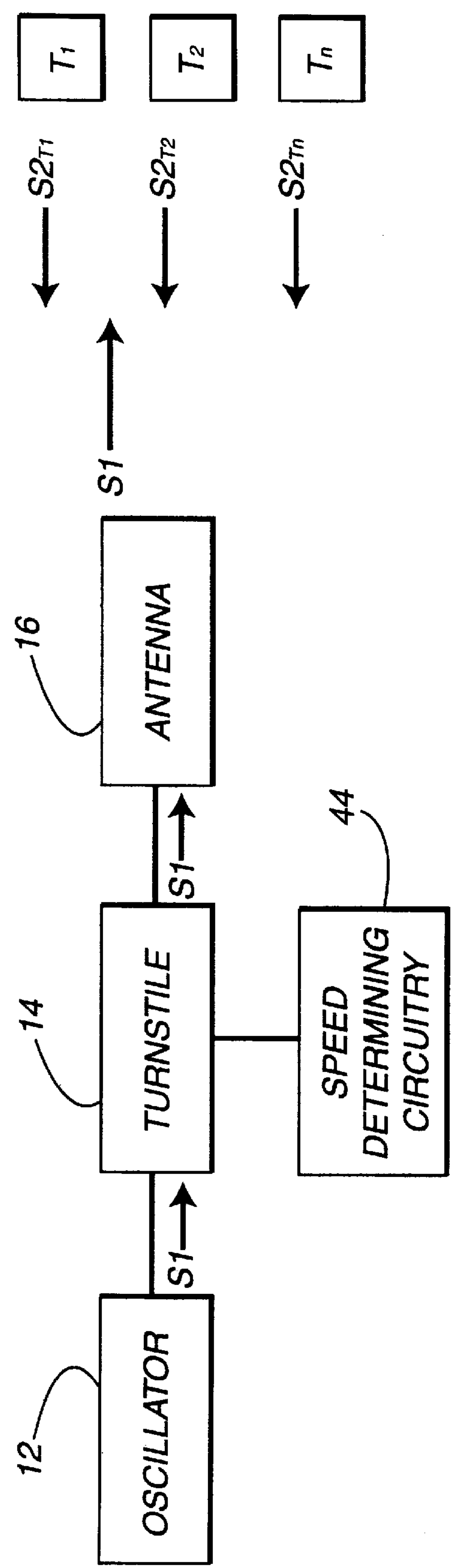
FIG. 1 is an overall schematic block diagram of the Doppler-based radar system of the present invention.

With reference now to the schematic block diagram of FIG. 1, there is shown a preferred embodiment of a Doppler-based radar system 10 for use in monitoring the speed of moving targets. More specifically, the radar system 10 of the present invention is adapted to determine the speed of a selected moving target traveling in generally the same direction as a moving platform supporting the radar system independent of the direction of the target relative to the platform. This allows the speed of target vehicles traveling in the same lane and in the same direction as the patrol vehicle to be monitored without manual intervention by the operator. The radar system 10 is further adapted in a stationary mode of operation to determine the speed of a selected moving target independent of the location of the patrol vehicle.

The radar system 10 includes a conventional Gunn diode oscillator to generate a constant wave radar signal S1. The radar or oscillator signal S1 is passed through a turnstile 14 to an antenna 16. In the preferred embodiment, the antenna is a circularly polarized horn antenna having a halfpower beam width of twelve (12) degrees in azimuth and elevation. The antenna 16 forms a transmitter to transmit the radar signal S1 toward at least one target $T_1$, $T_2$. . . $T_n$ and a receiver to receive the reflective return signals $\mathbf{S2}_{T1}$, $\mathbf{S2}_{T2}$. . . $\mathbf{S2}_{Tn}$, respectively. The return signal $\mathbf{S2}_{T1}$ is indicative, for example, of the speed of target $T_1$.

In accordance with well known Doppler principles, if the target $T_1$, for example, is moving toward or away from the antenna, the frequency (fr) of the transmitted signal S1 is shifted (fr±d) upon contacting the target $T_1$, thus forming the reflected radar signal $\mathbf{S2}_{T1}$ in accordance with the speed of the target.

Figure 2:
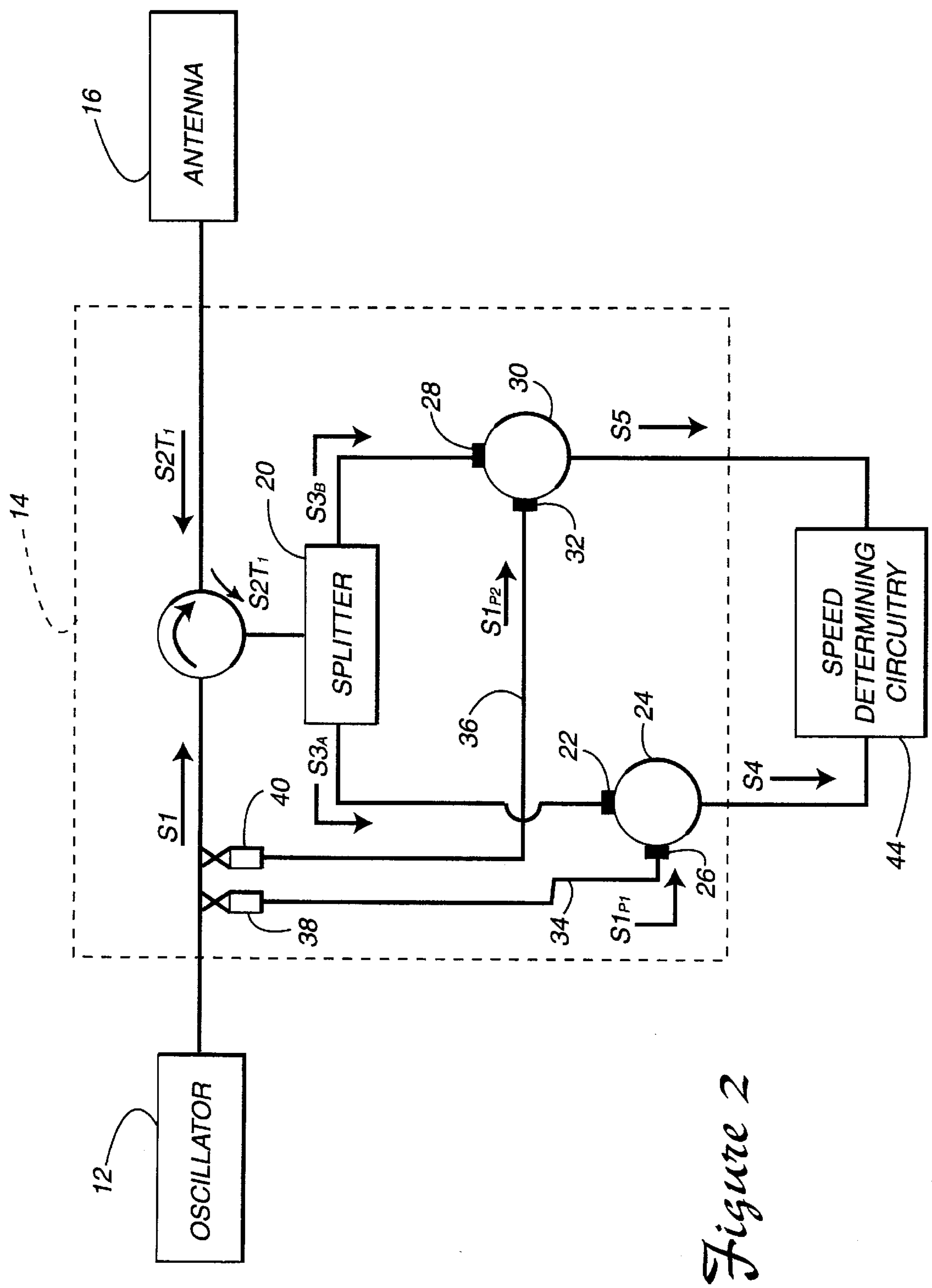
FIG. 2 is a detailed schematic block diagram of the turnstile of the present invention.

As shown in FIG. 2, the reflected return signals $\mathbf{S2}_{T1}$. . . $\mathbf{S2}_{Tn}$ are received by the antenna 16 and forwarded to a duplexer 18 within the turnstile 14. In use, the duplexer 18 isolates each return signal, for example $\mathbf{S2}_{T1}$, from the transmitted signal S1, converting the linearly polarized signals to circularly polarized signals. In the preferred embodiment, a splitter 20 in the form of a wave guide tee within the turnstile 14 substantially splits the return signal $\mathbf{S2}_{T1}$, thus generating first and second split signals $\mathbf{S3}_A$, $\mathbf{S3}_B$. The split signals $\mathbf{S3}_A$, $\mathbf{S3}_B$ are equivalent in phase and amplitude.

Also within the turnstile 14, the first split signal $\mathbf{S3}_A$ is forwarded to a first receive port 22 of a mixer 24, or mixer diode, where the signal $\mathbf{S3}_A$ is combined with a first coupled portion of the transmitted signal $\mathbf{S1}_{P1}$ or leakage signal forwarded to a second receive port 26 of the mixer 24. The mixer 24 combines the signals to form a test processing signal S4. Likewise, the second split signal $\mathbf{S3}_B$ is forwarded to a first receive port 26 of a mixer 28 where the signal $\mathbf{S3}_B$ is combined with a second coupled portion of the transmitted signal $\mathbf{S1}_{P2}$ forwarded to a second receive port 32 of mixer 30. The mixer 30 combines the signals to form a reference processing signal S5.

In accordance with an important aspect of the present invention, the resultant processing signals S4 and S5 are processed so as to be different in phase. For example, the microstrips or waveguides on/through which the split signals $\mathbf{S3}_A$, $\mathbf{S3}_B$ travel may be sufficiently different to cause the necessary difference in phase. Alternatively, an in-line phase shifter may be utilized. In the present preferred embodiment, as shown in FIG. 2, microstrip transmission lines 34, 36 of differing lengths connect each of a pair of sniffer probes 38, 40, or coaxial cables, to the second receive ports 26, 32 of mixers 24, 30 for coupling the portions of the transmitted signals $\mathbf{S1}_{P1}$, $\mathbf{S1}_{P2}$. Preferably the microstrip transmission line for the test processing signal S4 is one quarter wavelength longer than the transmission line for the reference processing signal S5.

As indicated above, the resulting processing signals S4 and S5 are equal in magnitude but sufficiently different in phase to allow the radar system 10, and specifically the speed determining circuitry 44, to determine the direction of a selected target T1 relative to the platform P and to accurately calculate the resulting speed. The phase differential in the processing signals S4 and S5 also assists the radar system 10 to accurately calculate the direction and speed of a selected target in a stationary mode of operation.

Figure 3:
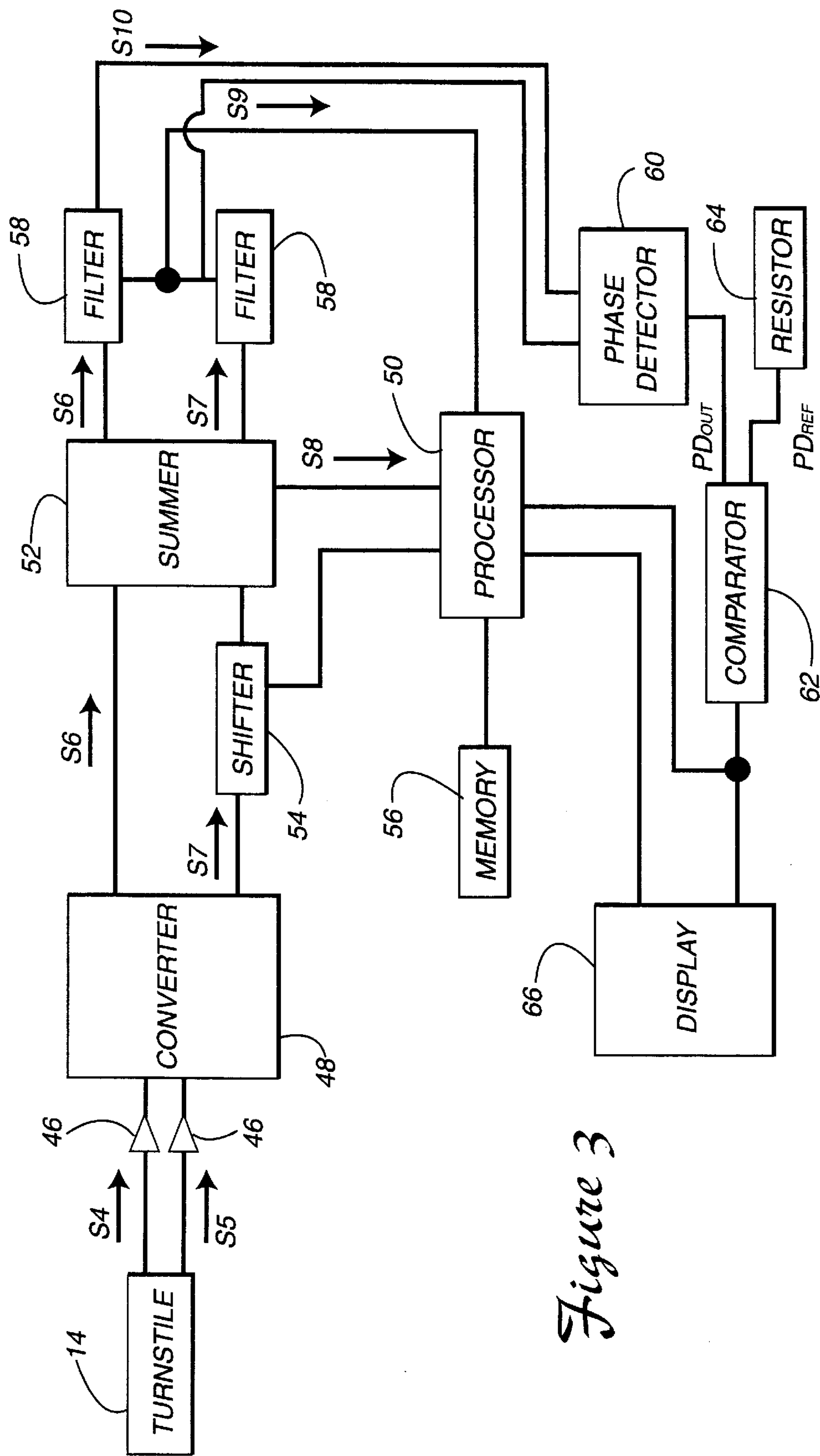
FIG. 3 is a schematic block diagram of the speed determining circuitry of the present invention.

As shown in FIG. 3, the resulting processing signals S4 and S5 are amplified by preamplifiers and converted into digital test and reference processing samples S6, S7 by an analog to digital converter 48. In the preferred embodiment, a stereo analog to digital converter is utilized to provide the processing samples S6, S7.

In the same lane moving mode of operation, the speed determining circuitry 44, and in particular a processor 50, transforms the output of summer 52 or the sum of the processing samples S8, from the time domain to the frequency domain to provide a frequency spectrum. It should be noted that filter 54 is selectively disabled in the moving mode of operation, but will be discussed below with regard to the stationary mode of operation. More specifically, in the preferred embodiment a digital signal processor is utilized to perform a fast Fourier transform on the sum of the processing samples S8. The resulting frequency spectrum includes a plurality of bins indicative of the Doppler components of the at least one target including the amplitude and frequency of each target $T_1$, $T_2$. . . $T_n$ forming the at least one target. During operation, the radar system 10 searches the Doppler components stored in memory 56 and selects a target T according to the present operating mode of the radar system.

For example, in a strongest target mode of operation, the Doppler components are searched by the processor 50 for a target having the highest amplitude. Similarly, in a fastest target mode of operation, the Doppler components are searched for a target having the highest frequency.

In the stationary mode of operation, the speed determining circuitry 44 and in particular, the processor 50 selectively shifts the phase of one of the processing samples prior to summing and transforming the resultant sample S8 from the frequency to the time domain. More specifically, the phase of the processing sample S7 is selectively shifted substantially ninety degrees either forward or backward depending upon the mode of operation of the radar system. To accomplish the phase shift a Hilbert transformer 54 is used to process the sample S7 utilizing the processor 50. By selectively shifting the phase of the processing sample S7 forward or backward, the radar system can selectively eliminate all approaching or receding targets depending upon the present patrol scenario. The elimination of the selected targets occurs when the non selected sample, S6 in the preferred embodiment, is summed with the shifted sample S7. The summation of the samples effectively cancels the unwanted target signals.

For example, the operator of a patrol vehicle parked on the shoulder of a divided highway and utilizing a rear facing antenna may desire only to monitor traffic on the same side of the divided highway as the patrol vehicle. In this particular scenario, the radar system is set to selectively filter all receding targets from the speed determining process by shifting the phase of the processing sample S7 substantially ninety degrees, thus reducing unwanted targets and additional noise. The additional shifting step increases the accuracy of the speed measurements, as well as, the overall flexibility and reliability afforded to the system operator.

In the stationary mode of operation, the sum of the processing samples S8 is converted from the time domain to the frequency domain, as described in detail above for the same lane moving mode of operation. Dependent upon the present selected mode of operation of the radar system, that is, the fastest or strongest signal mode, a target T is selected.

In accordance with another important aspect of the method of the present invention and independent of the selected stationary or moving mode of operation, once the selected target T is determined, the speed determining circuitry 44 selectively filters the processing samples S6 and S7 to allow only a range of frequencies substantially centered about the frequency of the selected moving target T to pass. In the present preferred embodiment, the filters 58 are band pass filters implemented by software algorithms. More specifically, the processor 50 selects an address in memory 56 dependent upon the frequency of the selected target T where the selected band pass filter coefficients are stored. The filter coefficients are a group of twelve numbers, in the preferred embodiment, which are processed by the processor 50, thus determining the filters 58. Selectively filtering the processing samples S6 and S7 in this manner increases the accuracy of the speed measurements, as well as the overall flexibility and reliability of the system.

A phase detector 60 of a type generally known in the art is next utilized to detect the phase difference between the filtered samples S9, S10. In the present preferred embodiment, the phase detector 60 is flip-flop phase detector which operates solely on the zero crossings of the filtered samples S9, SI0. The output of the phase detector 60 is in the form of a signal level $PD_{OUT}$. For example, if the sample S9 is leading S10 then the filter output should be above, for example, 0.0 or approximately 0.5. Alternatively, if sample S9 is lagging S10 the output should be below 0.0 for example −0.5. If the phases of samples S9 and S10 are substantially the same due to a weak target return signal or a dominant noise signal, the output will be somewhere in between these levels, and as a precautionary measure the radar system 10 does not provide a direction indication or a calculated speed in these instances.

The resulting signal output of the phase detector $PD_{OUT}$ is compared to a reference signal $PD_{REF}$ utilizing a comparator 62. In the preferred embodiment, the comparator 62 is a Schmidt trigger implemented in a software subroutine by processor 50 and the reference signal $PD_{REF}$ is of some preset or selectable value. The output of the comparator 62 indicating the leading/lagging relationship of the phases of samples S9, S10 is utilized by the processor 50 to calculate the speed of the selected target vehicle T, which is provided to the system operator via display 66. Additionally, the output of the comparator is utilized to drive a target direction indicator of display 66.

In summary, the overall flexibility and reliability of the Doppler-based traffic radar system 10 of the present invention is enhanced. This improvement is accomplished primarily by eliminating the need to rely on discretionary decision making by the operator. Specifically, the radar system 10 is adapted to split the return signals $S2_{T1}$. . . $S2_{Tn}$ and to shift the phase of one of the split signals $S3_A$, $S3_B$ within the turnstile 14. The split signals $S3_A$, $S3_B$ are next converted into digital processing samples S6, S7 for further processing by the speed determining circuitry 44. In particular, the processing samples are selectively filtered utilizing filters 58 prior to determination of the phase difference by the phase detector 60. Based on this determination, the speed of the target vehicle traveling in the same lane and in the same direction as the patrol vehicle P is determined without manual intervention from the system operator. The radar system 10 is further adapted in a stationary mode of operation to determine the speed of a selected moving target T independent of the location of the patrol vehicle P. This is accomplished through selective filtering of all unwanted approaching or receding targets depending upon the present traffic scenario.

The foregoing description of a preferred embodiment of the invention has not been presented to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for determining the speed of a selected moving target traveling in generally the same direction as a moving platform supporting a Doppler-based radar system and independent of the direction of the target relative to the platform comprising the steps of:

transmitting a signal from the platform toward at least one target;

receiving a return signal reflected from the at least one target, said return signal indicative of the speed of the at least one target including the platform;

forming a test processing signal and a reference processing signal, such that said processing signals are different in phase;

transforming said test and said reference processing signals into the frequency domain to provide a spectrum;

selecting the moving target from said spectrum, the selected moving target having a frequency and being determined by a mode of operation of the radar system;

filtering said processing signals to allow a range of frequencies substantially centered about the frequency of the selected moving target to pass;

sensing a direction of the selected moving target relative to the platform;

calculating the speed of the selected moving target, said calculation dependent upon the direction; and displaying the speed of the selected moving target, whereby the speed of the selected moving target is determined independent of the relative direction of the target to the platform and of operator intervention.

2. The method as claimed in claim 1, wherein the step of forming said processing signals includes the steps of substantially splitting said return signal into first and second split signals; and mixing said first split signal with a first portion of the transmitted signal and said second split signal with a second portion of the transmitted signal, said first and second portions being different in phase.

3. The method as claimed in claim 2, wherein the step of sensing the direction of the selected target relative to the platform includes the steps of generating an output signal indicative of the phase difference between said processing signals;

comparing said output signal to a reference signal; and the step of calculating the speed of the selected moving target is dependent upon the comparison between said output signal and said reference signal.

4. The method as claimed in claim 1, further including the step of selecting a filter for said processing signals from an array of selectable filters, said filter dependent upon the frequency of the selected moving target.

5. The method as claimed in claim 2, wherein said spectrum includes bins indicative of the amplitude and frequency of the at least one target.

6. The method as claimed in claim 5, wherein the step of selecting the moving target from said spectrum includes selecting the at least one target having the largest amplitude.

7. The method as claimed in claim 5, wherein the step of selecting the moving target from said spectrum includes selecting the at least one target having the highest frequency.

8. A method for determining the speed of a selected moving target from a stationary platform supporting a Doppler-based radar system comprising the steps of:

transmitting a signal from the platform toward at least one target;

receiving a return signal reflected from the at least one target, said return signal indicative of the speed of the at least one target;

forming a test processing signal and a reference processing signal such that said processing signals are different in phase;

shifting the phase of one of said processing signals dependent upon a first mode of operation of the radar system;

forming a composite signal by summing said processing signals including said shifted processing signal;

transforming said composite signal into the frequency domain to provide a spectrum;

selecting the moving target from said spectrum, the selected moving target being determined by a second mode of operation of the radar system;

calculating the speed of the selected moving target; and displaying the speed of the selected moving target, whereby all approaching or receding targets of said at least one target are selectively eliminated by shifting and summing the processing signals prior to transformation into the frequency domain.

9. The method as claimed in claim 8, wherein the step of forming said processing signals includes the steps of substantially splitting said return signal into first and second split signals; and mixing said first split signal with a first portion of the transmitted signal and said second split signal with a second portion of the transmitted signal, said first and second portions being different in phase.

10. The method as claimed in claim 9, wherein said spectrum includes bins indicative of the amplitude and frequency of the at least one target.

11. The method as claimed in claim 10, wherein the step of selecting the moving target from the spectrum includes selecting the at least one target having the largest amplitude.

12. The method as claimed in claim 11, wherein the step of selecting the moving target from said spectrum includes selecting the at least one target having the highest frequency.

13. A Doppler-based radar system for determining the speed of a selected moving target traveling in generally the same direction as a moving platform supporting said radar system and independent of the direction of the target relative to the platform comprising:

an oscillator to generate a signal;

an antenna to transmit said oscillator signal toward the at least one target and to receive a return signal reflected from the at least one target, said return signal indicative of the frequency of the at least one target and the platform;

a turnstile in communication with said antenna for receiving said return signal and forming a test processing signal and a reference processing signal such that said signals are different in phase;

circuitry for determining the speed of the selected target, the selected target being determined by a first mode of operation of the radar system;

first means of said circuitry for transforming said processing signals into the frequency domain to provide a spectrum; and second means of said circuitry for filtering said processing signals to allow a range of frequencies substantially centered about the frequency of the selected moving target to pass, whereby the speed of the selected moving target is determined independent of the relative direction of the target to the platform and of operator intervention.

14. The system of claim 13, wherein said second means of said speed determining circuitry includes an array of selectable filters.

15. The system of claim 14, wherein said speed determining circuitry includes a phase detector for determining the phase difference between said processing signals and generating an output signal;

a comparator for comparing said output signal to a reference signal to determine a direction of the selected target relative to the platform; and a processor for calculating the speed of the selected target dependent upon the direction of the selected target relative to the platform and said first mode of operation of the radar system.

16. The radar system of claim 15 wherein said turnstile includes a compensated wave guide tee for substantially splitting said return signal into first and second split signals; and wherein said turnstile mixes said first split signal with a first portion of the transmitted signal to form said test processing signal and said second split signal with a second portion of the transmitted signal to form said reference processing signal, said processing signals being different in phase.

* * * * *